United States Patent [19]

Bournas

[11] Patent Number: 5,452,431
[45] Date of Patent: Sep. 19, 1995

[54] MICROCIRCUIT FOR A CHIP CARD COMPRISING A PROTECTED PROGRAMMABLE MEMORY

[75] Inventor: Jean-Pierre Bournas, Chaville, France

[73] Assignee: U.S. Philips Corporation, New York, N.Y.

[21] Appl. No.: 945,756

[22] Filed: Sep. 16, 1992

[30] Foreign Application Priority Data

Oct. 30, 1991 [FR] France ............... 91 13409

[51] Int. Cl.⁶ ............... G06F 12/14; G06F 12/16
[52] U.S. Cl. ............... 395/442; 235/382;
364/DIG. 1; 364/246.6; 364/246.7; 364/246.8;
364/DIG. 2; 364/969.1; 364/969.2; 364/969.4;
364/969; 395/650; 395/700; 395/490;
395/497.01; 395/485
[58] Field of Search ............... 235/382; 395/425, 800;
364/246.7, DIG. 1, 246.6, 246.8, 969.1, 969.2,
969.4, 969, DIG. 2

[56] References Cited

U.S. PATENT DOCUMENTS

| | | | |
|---|---|---|---|
| 3,573,855 | 4/1971 | Cragon et al. | 395/425 |
| 3,742,458 | 6/1973 | Inoue et al. | 395/425 |
| 3,971,916 | 7/1976 | Moreno | 395/425 |
| 5,003,594 | 3/1991 | Shinagawa | 380/24 |
| 5,161,256 | 11/1992 | Iijima | 902/26 |
| 5,276,903 | 1/1994 | Shinagawa | 395/800 |
| 5,285,200 | 2/1994 | Kuriyama | 340/825.34 |
| 5,325,496 | 6/1994 | Hays et al. | 395/400 |

FOREIGN PATENT DOCUMENTS

9213322 8/1992 WIPO.

*Primary Examiner*—Glenn Gossage
*Assistant Examiner*—Reginald Bragdon
*Attorney, Agent, or Firm*—Michael J. Balconi-Lamica; Anne E. Barschall

[57] ABSTRACT

A microcircuit for a multi-application chip card, comprising notably a read-only memory (12), a programmable memory (13), and an addressing control circuit (14) for the programmable memory. The programmable memory (13) is subdivided into at least a repertory region (ZR) and an application region (ZA), the repertory region (ZR) comprising, for each application loaded therein, at least a reference code of an application i present in the region $ZA_i$ as well as the addressed $ZA_{il}$ and $ZA_{ih}$, respectively, of the beginning and the end of the region $ZA_i$ allocated to the relevant application. The microcircuit also comprises apparatus (25 to 50) for inhibiting any command (R, W or E) for the programmable memory (13) when it relates to an address outside the interval $ZA_{il}$–$ZA_{ih}$ of the application being processed, except when it concerns a specific priority operation provided by a program permanently stored in the read-only memory (12).

7 Claims, 2 Drawing Sheets

MICROCIRCUIT FOR A CHIP CARD COMPRISING A PROTECTED PROGRAMMABLE MEMORY

BACKGROUND OF THE INVENTION

The present invention relates to a microcircuit for a chip card, comprising inter alia input/output access means, at least one memory which is programmable and accessible via an addressing space with consecutive addresses, an addressing control circuit for said programmable memory which dictates either an inhibition or a validation of write and/or read commands by comparison of the requested address with two limit values in respect of the beginning and the end of a particular address region, which limits are stored within the addressing control circuit, said circuit also comprising a priority authorization channel enabling temporary cancellation of said inhibition in predetermined, specific circumstances.

A microcircuit of this kind is notably known from the document FR 2 304 989, corresponding to U.S. Pat. No. 3,971,916.

The use of portable cards incorporating an electronic integrated circuit or "chip" is well known in the field of banking; also known is their high operational security. It is in fact almost impossible to access given data inscribed in protected regions of the microcircuit without destroying the latter. Moreover, an identification protocol involving a personal and secret code inscribed in a protected region of the microcircuit causes inhibition of any tentative use of the card if the identification conditions are not satisfied.

In the case of a bank card, the manufacturer of the card first produces cards which do not contain personalized information, after which secret data which personalize each card is written therein. The cards are subsequently protected by irreversible technological locking steps.

The personal identification codes are then sent to each user (clients of the bank) and, via a different route, the cards themselves are despatched to the bank which requests the clients to pick up the cards. This system offers a high security against tentative abuse.

It is to be noted that a chip card can be used for applications outside the banking field where the practical aspects of portability of the card and its security of use offer interesting possibilities.

It could be envisaged to develop a specific microcircuit for each particular application, but it is more economical and simpler to conceive microcircuits of a type which is sufficiently universal so that the circuit can subsequently be programmed for the relevant application.

In this respect security problems arise if the writing of the secret identification data and the functional data for the actual application is entrusted to an entity other than the manufacturer of the microcircuit.

A person having bad intentions who succeeds in acquiring "virgin" cards and who has also obtained knowledge on the inscription techniques for a given application could illegally create falsified cards by imitating the original data inscription technique.

Therefore, the entity issuing the card, not being the manufacturer of the microcircuit, may wish to load the data of its application itself, so as not to disclose its secrets to the manufacturer of the microcircuits.

These security problems are aggravated when the formation of "multi-application" cards of a universal type is envisaged, which cards are originally virgin-like and are to be successively loaded, in an arbitrary succession, with data and programs of different applications by issuing entities which are unrelated to one another. Therefore, the aim will be to achieve a dynamic allocation of the programmable memory in adequate security conditions.

The manufacturer of the microcircuits should be able to ensure a possibility for protection of several regions of the memory for which he does not yet know the individual limits so that each issuing entity could protect the region in which it has loaded its secret functional data against any reading or writing attempts stemming from another application, regardless of whether these attempts stem from a programming error induced by the entity having issued said other application or from illegal programming by a fraud. Notably, it would be illusionary to supply a plurality of entities, capable of loading various applications, with programming secrets relating to the loading of all applications and still hope that these secrets will never get into the hands of personnel having bad intentions. No solution can be envisaged in this direction, the more so because a fully authorized but malicious entity could issue an application containing a programming error leading to the destruction of data contained in an application which is not its own.

SUMMARY OF THE INVENTION

The invention relates specifically to a microcircuit for a chip card of the multi-application type in which a high security level is maintained despite the fact that the card is manufactured in a "virgin" state and that it can be loaded, in a random order, by entities issuing applications which are independent from one another. The desired microcircuit should somehow have at its disposal locks which are mobile but which cannot be violated either during loading or operation or by application of any signal to the input/output acces means.

Amongst other things, it is an object of the invention to provide a solution to this technical problem.

According to one aspect of the invention, a microcircuit for a chip card of the kind set forth is characterized by comprising a processor cum read-only memory containing functional routine that is exclusively accessible to the processor, said circuit comprising a read-write memory having a repertory region and an application region that are mutually exclusive, the repertory region accommodating storage of a table containing for each program of a plurality of mutually independent application programs a respective reference code as well as in lockable register means associated upper and lower limit address values of a contiguous address subspace of said application region exclusively allocated to said application program, said circuit comprising control means for under control of said upper and lower limit address values and associated reference code granting a memory access to the associated subspace but otherwise negating said access, and said circuit comprising a priority authorization channel enabling temporary cancellation of said negating exclusively through execution of said functional routine causing unlocking of said register means for one particular said application program, and said circuit comprising loading means for through execution of said functional routine loading said particular application program.

Thus, in the general case where an application program has already been loaded into the card and is called via the input/output access means, from among the functional routines, a standard protocol recognizes the actual use. Thereafter, another routine controls a search in the repertory table, the address limit values pertaining to the requested application program, identified in said table by its reference code, said values being loaded into the limit registers which are unlocked during this initial operation step.

The requested application program is subsequently initiated and at the same time the limit registers are locked so that write or read requests which would address the programmable memory outside the address region between the stored limit values will remain without effect, for example until the microcircuit is switched off. In fact, the priority authorization channel is thus closed again. Thus, an application program relates exclusively to the ability to read or write in the address region associated therewith and fixed during loading. The other application programs are protected against any tentative reading or writing.

As far as the loading of any new application program into the card is concerned, the security resulting from the absence of interference with other regions of the programmable memory is provided by similar means.

Any request made on the input/output access means for loading an application program is subject to a standard protocol in connection with a special functional routine contained in the read-only memory. The reference code of the application as well as the memory space required must be announced during this protocol. A specific functional routine serves to search in the repertory table the first address available in the application region (the address which follows the highest end address of the application programs already loaded or the first address of the application region when the card is in the virgin-like condition). The end address of the requested application is calculated on the basis of the memory space request previously announced. When this end address of the application is compatible with the memory space of the application region, the limit values of the beginning and end addresses as well as the application reference code are written into the repertory table and these limit values are loaded into the limit registers, via a predetermined and intangible functional routine in all circumstances.

During these steps, preceding the loading, the limit registers are unlocked and may remain so during the subsequent loading of the application program. Nevertheless, the desired security is preserved by the fact that the loading of the application program is performed under the control of the central unit and by way of a predetermined and reliable functional routine which excludes any modification of the contents of the limit registers.

Locking of these registers may also be realized under the control of programming just before loading.

Any tentative loading beyond the address limits established in advance will remain without effect. The loading operation can be completed, if deemed necessary, by a routine for verification of the loaded data, a verification of the signature, a parity check, etc., but such operations do not substantially increase the security of the operation of the microcircuit in accordance with the invention.

The priority authorization channel may be controlled in different ways by application of appropriate logic conditions and as a function of the execution of operation steps succeeding the activation of the microcircuit.

However, in a preferred embodiment of the invention, offering full security, the microcircuit is characterized in that it comprises a flip-flop which is set to a first state exclusively when the microcircuit is activated, after which it is set to a second state, opposing the first state, as soon as an instruction counter associated with the central unit contains an address value situated in the addressing space of the programmable memory, and in that said flip-flop supplies a locking/unlocking signal for controlling the locking of the limit registers and for controlling the priority authorization channel.

Because it is linked to the instruction counter, the locking/unlocking signal offers a means which cannot be violated by an application program in order to lock the limit registers and the priority authorization channel, even though the flip-flop inherently remains an element which is reversible in time.

Because the functional routines which serve to read and/or write in the repertory table are inscribed in the read-only memory, the instruction counter serves as a pointer for this memory so as to execute these routines step by step.

Therefore, it suffices to situate the execution of these routines in the operating steps preceding the execution of any program inscribed in the programmable memory. The priority authorization channel is still open for as long as routines executed under the control of the central unit are concerned. As soon as an address indicating the programmable memory is to be loaded into the instruction counter, the locking/unlocking signal will be immediately set to its state in which blocking takes place, thus locking the limit registers and inhibiting the access to the repertory table.

In practice this can be attractively realised in a microcircuit which is characterized in that the addressing control circuit comprises an OR-gate, referred to as a validation gate, whose output controls the transmission of write and read signals for the programmable memory, and in that a first input of said validation gate receives a signal resulting from the comparison of any address called with the content of the limit registers, and another input, via which the priority authorization takes place, receives a signal resulting from the logic product of the locking/unlocking signal and the output signal of an address decoder which recognizes the single addresses of the repertory region.

Until now it has been assumed that the addressing space of the programmable memory was protected in the stated conditions regarding the repertory region and the application region.

However, it may also be useful to create also a given region of the addressing space of the programmable memory which is freely accessible by any application program, for example for provisionally storing therein processing results or for transmitting of data from one application to another.

This facility can be readily obtained without affecting the security, by way of a slight modification of the previously defined addressing control circuit. Such an embodiment of a microcircuit in accordance with the invention is characterized in that a region which is referred to as a "public" region is also provided in the addressing space of the programmable memory, which region is distinct from the repertory region and the application region, and in that the addressing control circuit comprises a supplementary address decoder which recognizes the single addresses of the public region and which outputs a signal which is applied to a supplementary input of the validation OR-gate.

BRIEF DESCRIPTION OF THE DRAWINGS

The invention will be described in detail hereinafter with reference to the accompanying drawings.

DETAILED DESCRIPTION OF THE PREFERRED EMBODIMENTS

Figure 1:
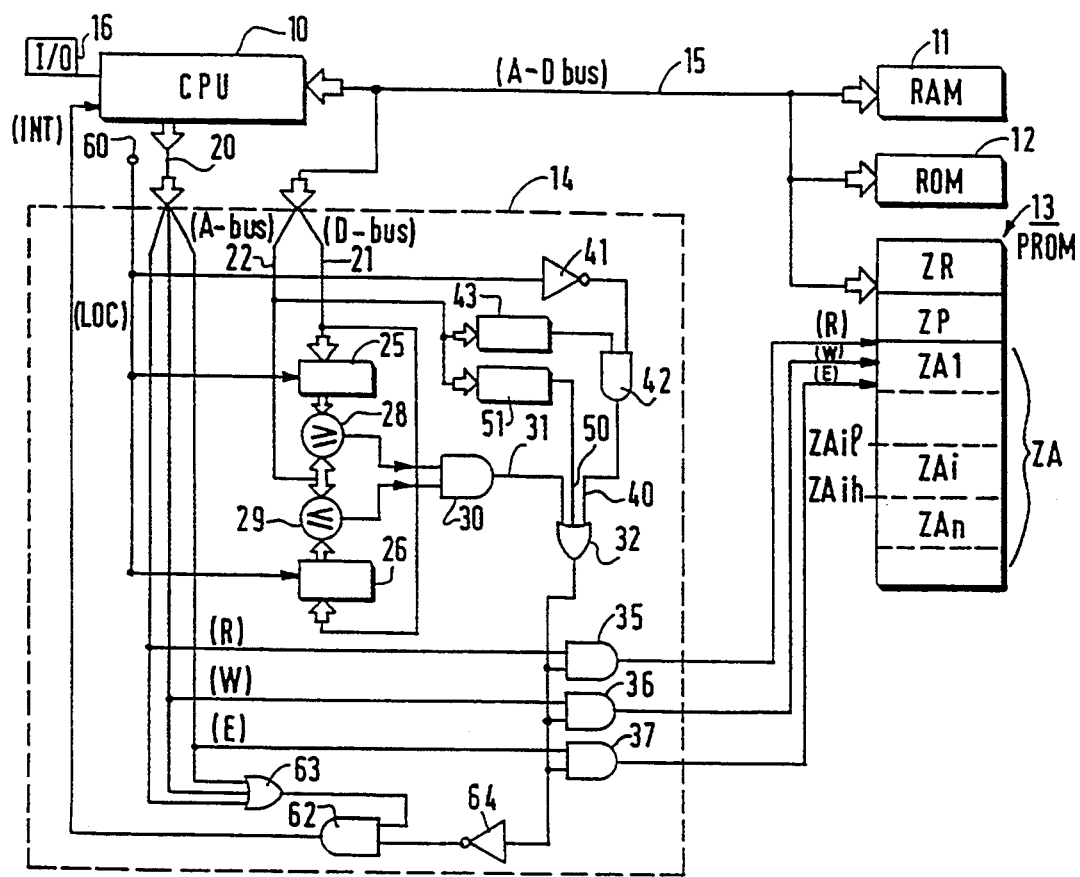
FIG. 1 shows a circuit diagram of a microcircuit in accordance with the invention.

FIG. 1 shows the general circuit diagram of a microcircuit in accordance with the invention in simplified form.

For the sake of clarity, the elements in this Figure which do not relate directly to the invention have been omitted. The microcircuit comprises a central microprocessor unit 10, a random access memory 11, a read-only memory 12, a programmable memory 13, for example an EEPROM, as well as an addressing control circuit 14 for the programmable memory 13. The said elements are interconnected by way of a bus system 15 on which the addresses and the data are transported between the various elements. For the sake of simplicity, the bus system 15 is represented by a single connection, but use can also be made of a separate address bus and a separate data bus. As is common practice, the bus system 15 may also be a single bus on which the addresses and the data are time multiplexed. With the central unit 10 there are associated input/output access means 16 which are isolated from the system bus 15 so that they ensure controlled access by the central unit 10 to the sensitive regions of the microcircuit which contain data to be protected.

From the central unit 10 the addressing control circuit 14 receives a set of commands 20, the most essential of which are the write commands W, the read commands R and the erasure commands E when intended for the programmable memory 13.

The write and read commands for the random access memory 11 and the read commands for the read-only memory 12 are not shown for the sake of clarity of the Figure and also because they do not interfere with the invention. The commands W, R and E for the programmable memory 13 can be inhibited or validated by the addressing control circuit 14 in the circumstances to be described hereinafter. As in customary in practical microcontrollers, the read-only memory 12 and the programmable memory 13 form part of the same addressing system while the random access memory 11 is addressed in a manner which is exclusive and distinct from the addressing of the memories 12 and 13. In the addressing space of the programmable memory 13 there are defined a repertory region ZR and an application region ZA, which regions are separate from one another and are defined once and for all upon manufacture.

Initially, the regions ZR and ZA are empty. The microcircuit may be loaded with application programs which are independent of one another and in an order and at instants which are arbitrary. During the loading of said programs they will be successively written into distinct regions $ZA_1, \ldots, ZA_i, \ldots, ZA_n$ which adjoin one another and which progressively fill the application region ZA.

It is to be noted that each region $ZA_i$ of a given application may also contain data (other than the operating codes) which belong to the relevant application and/or memory locations intended to receive processing results. In accordance with the invention, the repertory zone ZR contains a repertory table in which the beginning and end addresses as well as a reference code of each of the application programs loaded into the application region are inscribed during the loading of said programs. Thus, an $i^{th}$ application program loaded into the region $ZA_i$ between the addresses $ZA_{il}$ and $ZA_{ih}$, being the beginning and the end of the application program i, has been loaded by running one of the functional routines contained in the ROM during which the addresses $ZA_{il}$ and $ZA_{ih}$ have been determined in advance and loaded into the repertory table of the repertory region ZR, accompanied by a reference code of the application program i. The loading protocol mentioned utilizes one of said functional routines inscribed in an unalterable manner in the read-only memory 12.

The addressing control circuit 14 is controlled so as to inhibit the read commands (R), the write commands (W) and the erasure commands (E) for the programmable memory 13 for addresses which are situated outside the interval determined by the limit values of the beginning $ZA_{il}$ and the end $ZA_{ih}$ of an application $ZA_i$ designated in advance on the input/output access means 15. To this end, the bus system 15 is subdivided from the input of the addressing control circuit 14 into a data bus 21 and an address bus 22. The data bus 21 is fed in parallel to two registers which can be locked and which are referred to as limit registers 25 and 26, respectively, in which the addresses of the beginning and the end of an application being processed can be stored and locked by means of a locking/unlocking signal (LOC) from a terminal 60. The address bus 22, inside the addressing control circuit 14, is connected in parallel to two comparators 28 and 29, respectively, which are associated with the limit registers 25 and 26. The comparator 28 supplies an authorization signal when the current address on the address bus 22 is higher than or equal to the beginning address stored in the limit register 25, while the comparator 29 supplies a second authorization signal when the current addess on the address bus 22 is lower than or equal to the end limit address of the application stored in the register 26. The two authorization signals appearing at the output of the comparators 28 and 29 are applied to the two inputs of an AND-gate 30 whose output supplies 31 an authorization signal when the current address presented on the address bus 22 is situated between the address limits stored in the registers 25 and 26. The authorization signal present at the output 31 of the gate 30 is applied, via an OR-gate 32 which is referred to as a validation gate, to one of the inputs of three AND-gates 35, 36, 37, the other input of each of which receives the read command (R), the write command (W) and the erasure command (E), respectively. Therefore, these commands are applied to the programmable memory 13 exclusively if the AND-gates 35, 36, 37 conduct, i.e. when the current address present on the address bus 22 is situated between is coincident with the address limits stored in the registers 25 and 26; these commands are inhibited if the current address is beyond said limit values.

The OR-gate 32 constitutes an element which has previously been referred to as a priority authorization channel because of the fact that it comprises a second input 40 which receives an authorization signal during a predetermined operating step which follows any activation of the microcircuit.

In order to realise said priority authorization channel, the locking/unlocking signal (LOC) is inverted by an inverter 41 and applied to one of the two inputs of an AND-gate 42. The other input of said AND-gate 42 receives the output signal of an address decoder 43 which recognizes exclusively the addresses of the repertory region (ZR) and which supplies the AND-gate 42 with an authorization signal when the current address presented on the address bus 22 is situated within the addressing space of the repertory region (ZR). The AND-gate 42 thus forms the logic product of the locking/unlocking signal (LOC) and the output signal of the address decoder 43 in order to supply a priority authorization signal to the input 40 of the validation gate 32. The address decoder 43 which recognizes exclusively addresses from the repertory region (ZR) of the programmable memory 13 may be of a very simple type when the number of octets of the repertory region (ZR) can be expressed as an integer power of two, such as a value of 256 octets or 512 octets etc. For example, the repertory region may have a beginning address expressed in hexadecimal form by the value 8000 and the address of the end of said region may be expressed by the hexadecimal address 80FF.

The microcircuit shown in FIG. 1 also comprises an optional facility in that a so-called "public" region ZP is provided in the addressing space of the programmable memory 13, which region is distinct from the repertory region ZR and the application region ZA and is situated, for example between the regions ZR and ZA and adjacent thereto. Because unconditional access exists to said public region ZP, the validation gate 32 comprises a third input 50 via which a validation signal is applied which originates from an address decoder 51 which is similar to the address decoder 43, except for the fact that it only recognizes exclusively the addresses of the public region ZP of the programmable memory 13.

As has already been mentioned, the locking/unlocking signal (LOC) is set to an unlocking state (LOC=0) during a predetermined operation step which follows any activation of the microcircuit. It can be generated by any suitable logic system enabling the authorization of the loading of the limit registers 25 and 26 and the unblocking of the AND-gate 42 so as to enable the writing and/or reading of the repertory table contained in the repertory region ZR.

In an embodiment of the invention which is particularly attractive in view of the high security offered, the locking/unlocking signal (LOC) is produced in combination with the contents of an instruction counter of a generally known type and associated with a central microprocessor unit.

Figure 2:
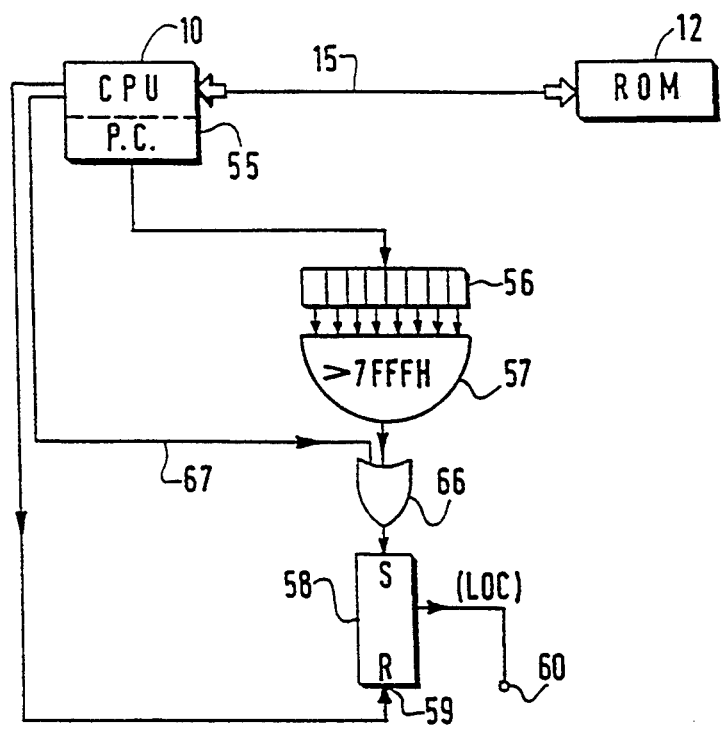
FIG. 2 shows a block diagram of a part of the microcircuit which supplies a locking/unlocking signal, and FIG. 3 diagrammatically shows the organization of a particular region of the programmable memory.

This part of the microcircuit will now be described with reference to FIG. 2.

This Figure shows an instruction counter 55 which forms part of the central unit 10 and which enables the step-wise execution of functional routines contained in the read-only memory 12. This facility is conventional in all microcontrollers or microprocessors and, therefore, does not require a detailed description. The instruction counter 55 is connected to a decoder 56, 57 whose output triggers, via an OR-gate 66, a flip-flop 58, for example of the type RS, when the content of the instruction counter 55 exceeds a given address value which, in the present example has the hexadecimal limit value 7FFF. This address limit corresponds to the case where the lowest address of the programmable memory is expressed by the value 8000 in hexadecimal form. A functional routine, being conventional in the field of microcontrollers, resets a given number of registers to zero and in the present case applies a reset-to-zero signal to the flip-flop 58, i.e. to its reset-to-zero input 59. The flip-flop 58 ultimately applies the locking/unlocking signal (LOC) on the terminal 60, also shown in FIG. 1, to the input of the addressing control circuit 14.

At the end of an activation of the microcircuit, when the central unit 10 executes the functional routines contained in the read-only memory 12, the instruction counter 55 designates program addresses relating to this read-only memory and the flip-flop 58 supplies an unlocking signal (LOC=0). The repertory table may be read or written under the control of the central unit 10 and the limit registers 25, 26 may be loaded by this central unit. However, when an application program is called (so that the address contained in the instruction counter 55 necessarily exceeds the hexadecimal address 7FFF given as a limit in the present example), the flip-flop 58 is set to the opposite state and supplies a locking signal on the terminal 60 (LOC=1). The limit registers 25 as well as the priority authorization channel are nevertheless locked until the next deactivation of the microcircuit. It is thus demonstrated that this facility offers full security to ensure absence of interference between the various application programs that could be loaded into the application region ZA.

The OR-gate 66 also enables an alternative operation where the locking signal (LOG=1) may be formed by a specific routine contained in the ROM 12, that is to say even if the content of the counter has not yet exceeded the limit value 7FFF. The functional routine provided for this purpose makes the central unit 10 supply a command signal on a connection 67, which signal is applied to a second input of the OR-gate 66. A locking signal can thus be supplied by programming, which signal will subsist until the next resetting to zero. This facility even further increases the security during the loading of a new application program and during the execution of an application which utilizes only routines contained in the read-only memory 12 and whose region $ZA_i$ reserved in the programmable memory contains only data (and no operating code).

Figure 3:
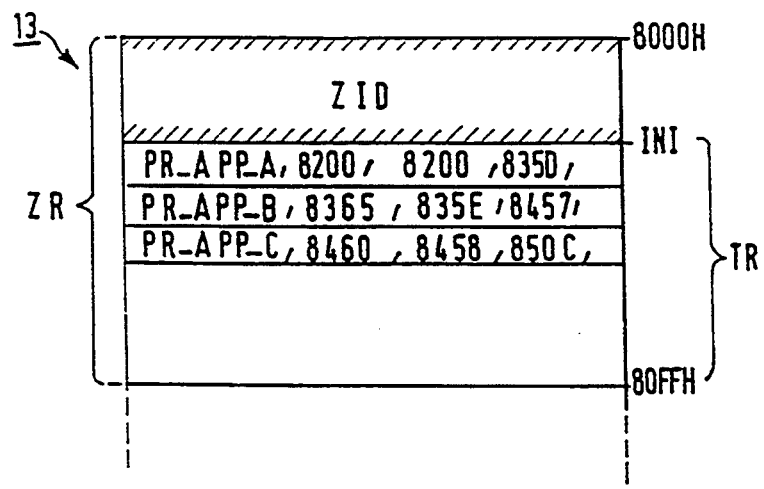

The possible organization of the repertory region ZR of the programmable memory 13 will be described in detail with reference to FIG. 3. FIG. 3 again relates to an example where the values are purely arbitrary and only serve to make the explanation clearer.

It is assumed that the repertory region of the programmable memory 13 commences at the hexadecimal address 8000 and ends at the address 80FF. In this region, having a volume of 256 octets, if desired, there may be provided a segment which is denoted by the reference ZID and which serves to receive identification data of the card, the proprietor of the card, and keys. Outside the identification region ZID there is situated the actual repertory table TR which starts at the address INI and which extends as far as the hexadecimal address 80FF. As is indicated in the Figure, the repertory table TR contains the successive inscriptions of a first loaded program whose reference code is referred to as "PR-APP-A", which has a length of 350 octets and whose hexadecimal address of the beginning of the program execution is equal to 8200, as well as the address of the beginning of the region, the address of the end of the region being equal to 835 D, followed by a program referenced "PR-APP-B" having a length of 250 octets and an address of the start of the program execution with the hexadecimal value 8365 for the beginning address of the region, 835E for the end address 8457, and finally a program which is denoted as "PR-APP-C" having a length of 180 octets, a start of program execution address having a hexadecimal value 8460 for the address of the beginning of the region, 8458 and for the end address the value 850C. Actually, the addresses for the beginning of the execution of the program, as indicated for this example, do not necessarily coincide with the beginning address of the region allocated to the same program, but are necessarily situated within said allocated region.

First the case will be described where an application program already loaded into the card is called via the input/output access means.

Any request for the execution of an application program is subject to a procedure which can be decomposed into five principal steps:

an initialization step which may include an identification procedure for the card and its user,
a procedure for requesting the application announced via the input/output means,
a search procedure in the repertory table TR in order to determine whether the requested application exists and, if affirmative, the loading of the data specific of the application in said table,
the loading of the limit registers,
and finally the actual execution of the requested application program.

As soon as the microcircuit is activated, the flip-flop 58 is reset to zero at the same time as a given number of registers, and notably also the instruction counter 55. After a recognition protocol, if any, utilizing the identification data contained in the identification segment ZID of the repertory region ZR, an application program, for example the program "PR-APP-B" is called.

Under the control of a predetermined routine, the central unit 10 performs a search in the repertory table TR so as to determine whether such an application program is present. In the affirmative case, the address values of the beginning and the end of this application program, being the hexadeximal addresses 835E and 8457, respectively, in the present example, are fetched from the repertory table TR and, still under the control of a predetermined routine, these limit values are loaded into the limit registers 25 and 26, respectively. The operation of the microcircuit has thus far utilized only routines situated in the read-only memory 12 so that the instruction counter has never exceeded the address limit designating the programmable memory 13, being an address higher than the hexadecimal value 7FFF in the present example. During the subsequent operating step, consisting of the execution of the program called, the instruction counter 55 is charged with the address of the beginning of the execution of the application program called, for example the hexadecimal address 8365. This induces a change of state of the tip-flop 58 and produces a locking signal (LOC=1) on the terminal 60. Under the influence of this signal, the limit registers 25 and 26 are locked and the priority authorization channel formed by the branch comprising the inverter 41, the AND-gate 42 and the input 40 of the validation gate 32, is blocked. Nevertheless, the write, read and erasure operations in the programmable memory can no longer be executed, except in the sole segment situated between the limits of the beginning and the end of the program called or in the public region ZP. This selective access continues until the microcircuit is deactivated. The write and read operations in the so-called public region ZP remain possible by way of the authorization signal present at the input 50 of the validation gate 32 and originating from the address decoder 51 which recognizes the addresses corresponding to said region ZP.

Hereinafter the operation of the microcircuit will be described for the case where an application program is to be loaded into the programmable memory 13. As soon as the microcircuit is activated, an initialization step is triggered which is essentially similar to that already described for the execution of an application program. During a second step, under the control of a predetermined functional routine, the reference code of the program to be loaded is announced on the inputs/outputs as well as the memory volume necessary for this program which is expressed, for example as a number of octets. During a third operating step, again under the control of a predetermined functional routine, a search is performed in the repertory table TR contained in the repertory region ZR in order to determine whether the requested program has already been loaded; if not, a search is made for the last limit address of the end of the program inscribed in the table. This address also corresponds to the highest occupied address of the region ZA, because the programs have been successively loaded at ascending addresses. In the present example it concerns the hexadecimal value 850C. The same functional routine determines on the one hand the directly subsequent address value, that is to say the hexadecimal address 850D which will serve as the limit value of the beginning of the new program to be loaded, and on the other hand calculates the prospective address of the end of the program to be loaded, taking into account the memory volume announced during the second step. During a fourth step, the central unit performs a test so as to determine whether the address of the end of the program thus calculated is compatible with the highest address of the application region ZA, after which, under the control of a predetermined routine, the limit values of the beginning and the end of the program thus determined are loaded into the limit registers 25 and 26. Because the central unit has thus far executed functional routines contained within the read-only memory 12, the instruction counter has not yet exceeded the limit of the address values concerning the programmable memory 13. Thus, the locking/unlocking signal is in its unlocking state (LOC=0), enabling the loading of the limit registers 25 and 26 as well as the reading of the repertory table by way of the priority authorization channel 41, 42 and 32. During a fifth step, under the control of a functional routine, the central unit 10 completes the repertory table of the repertory region ZR by inscribing, subsequent to the series of references already presented, the reference code, the limit values of the beginning and end addresses previously determined and concerning the application program being loaded, as well as the address of the start of execution of this program.

A subsequent, sixth operating step relates essentially to the loading of said program, which loading can be accomplished only within the limits fixed by the address values of the beginning and the end stored in the limit registers 25 and 26. During such loading, the limit registers 25 and 26 may not be locked (LOC=0), but said registers carry out the checking of the write operations in the same way as if they were locked. Security is nevertheless maintained because of the fact that loading is executed under the control of the central unit 10 by way of a functional routine which cannot be modified by a user. However, it is also possible to activate the flip-flop 58 by programming by means of a signal transmitted, via the connection 67, to the OR-gate 66. In this case the limit registers may be locked during the loading. Any tentative loading of an application program having a length exceeding the announced memory volume will remain ineffective because of the control exerted by the limit registers 25 and 26 and the AND-gate 30.

If desired, the step for loading the program may be followed by a verification of the loaded data, a final verification of the signature, a parity check, etc. A tentative loading of a program having a length exceeding the length announced can be readily detected because of the fact that the last data presented for loading are in fact not stored in the programmable memory so that a verification of this final data reveals the attempted abusive loading, being either accidental or fraudulent.

Referring to FIG. 1 again, an additional device for signalling an operation anomaly will now be described. This additional device comprises an AND-gate 62 having two inputs, an OR-gate 63 having three inputs, and an inverter 64.

The input of the inverter 64 receives the output signal of the validation gate 32 and applies this signal, after inversion, to an input of the AND-gate 62.

The output of the OR-gate 63 is connected to the other input of the AND-gate 62 and its input receives the three control signals R, W E destined for the programmable memory 13, thus forming the logic sum of these control signals.

When one of these operations is requested, the signal at the output of the OR-gate 63 is high. At the same time, if none of the authorization conditions is satisfied, producing a low signal at the output of the OR-gate 32, the AND-gate 62 is activated and produces a signal at its output which is applied to the central unit 10, for example an interrupt signal (INT=1).

Thus, when an interruption is used, an anomaly in the operation and more particularly a non-authorized request for access to the programmable memory 13 will lead to an interruption in the operation of the microcircuit (non-maskable interruption) and, if desired, an alarm message can be produced on the user terminal for the card.

The signal INT formed in the case of an anomaly can be used to produce any desirable modification of the operation of the microcircuit: for example, invalidation of the program having produced the anomaly, total invalidation of the operation of the card.

An attractive aspect of the invention is that only the functional routines written in the read-only memory must be extensively tested and approved, while the application programs may be created by various entities under their own responsibility and without under risk of interference between the applications.

The microcircuit in accordance with the invention thus offers perfect security for the use of a multi-application chip card.

I claim:

1. A microcircuit for a chip card, comprising:
   (a) a processor for accessing a memory address space;
   (b) a read-only memory in the memory address space and which contains functional routines that are exclusively accessible to the processor;
   (c) a programmable memory in the memory address space comprising a repertory region and an application region which are distinct from one another, the application region being allocable into separate and distinct application sub-regions, each sub-region being allocable for accommodating storage of one of a plurality of independent application programs, each of said application sub-regions when loaded with an application program comprising an address space defined by contiguous addresses between unique upper and lower limit address values, the repertory region accommodating storage containing, for each application program stored in a respective application sub-region, a respective reference code and respective upper and lower limit address values of contiguous addresses of an application sub-region exclusively allocated to an application program;
   (d) lockable means for storing upper and lower limit address values;
   (e) the functional routines in said read-only memory comprising, under the control of the processor, a first routine for loading an application program into an application sub-region including allocating address space needed by the application program and storing upper and lower limit address values of said allocated address space in the repertory region, and a second routine for obtaining from the repertory region and loading in the lockable means upper and lower limit address values of a particular application program in response to a call from the processor to run the particular application program;
   (f) control means for controlling access to the programmable memory including:
      (i) means for making a comparison between an address requested by a running application program and upper and lower limit address values stored in the lockable means by said second routine from the repertory region and corresponding to the running application program;
      (ii) means in response to the requested address lying inside the upper and lower limit address values in the lockable means for granting memory access to the requested address and in response to the requested address lying outside the upper and lower limit address values for denying memory access;
      (iii) in response to a command to run a designated application program, a priority authorization channel for temporarily unlocking said lockable means and for storing therein the upper and lower limit address values of the designated application program when the second routine is executed and for restoring a locked condition to the lockable means while the designated application program is running;
   (g) the processor comprising an instruction counter, and the priority authorization channel comprising a flip-flop connected to receive a reset command from the processor when the processor is initialized, and to receive a set command in response to an address value contained in the instruction counter when said address value designates an address in the address space of the programmable memory, said flip-flop being operative to supply a locking/unlocking signal for controlling the locking of the lockable means and for controlling the priority authorization channel.

2. The microcircuit of claim 1, wherein the repertory region comprises a table containing for each stored application program its reference code and upper and lower limit address values.

3. The microcircuit of claim 2, wherein the lockable means comprises registers.

4. The microcircuit of claim 1, further comprising an address decoder, said priority authorization channel comprising validation OR-gate connected to control transmission of read/write signals to the programmable memory, said validation OR-gate having a first input for receiving a signal from the comparison means and a second input for receiving a signal resulting from the logic product of the locking/unlocking signal and an output signal from the address decoder when the address decoder recognizes an address to the repertory region.

5. The microcircuit of claim 4, wherein the programmable memory further comprises a public region distinct from the repertory region and the application region, said control means further comprising a supplementary address decoder which functions to recognize an address to the public region and in respond thereto outputs a signal to the validation OR-gate.

6. The microcircuit of claim 4, further comprising an additional OR-gate and an additional AND-gate for supplying an interrupt signal in response to a first input supplied by the validation OR-gate and a second input supplied by the logic sum of write, read and erase signals at the output of the additional OR-gate.

7. A microcircuit for a chip card, comprising:
(a) a processor, having an instruction counter, for accessing a memory address space;
(b) a read-only memory in the memory address space and which contains functional routines that are exclusively accessible to the processor;
(c) a programmable memory in the memory address space comprising a repertory region and an application region which are distinct from one another, the application region being allocable into separate and distinct application sub-regions, each sub-region being allocable for accommodating storage of one of a plurality of independent application programs, each of said application sub-regions when loaded with an application program comprising an address space defined by contiguous addresses between unique upper and lower limit address values, the repertory region accommodating storage containing, for each application program stored in a respective application sub-region, a respective reference code and respective upper and lower limit address values of contiguous addresses of an application sub-region exclusively allocated to an application program;
(d) lockable means for storing upper and lower limit address values;
(e) the functional routines in said read-only memory comprising, under the control of the processor, a first routine for loading an application program into an application sub-region including allocating address space needed by the application program and storing upper and lower limit address values of said allocated address space in the repertory region, and a second routine for obtaining from the repertory region and loading in the lockable means upper and lower limit address values of a particular application program in response to a call from the processor to run the particular application program;
(f) control means for controlling access to the programmable memory including:
(i) means for making a comparison between an address requested by a running application program and upper and lower limit address values stored in the lockable means by said second routine from the repertory region and corresponding to the running application program;
(ii) means in response to the requested address lying inside the upper and lower limit address values in the lockable means for granting memory access to the requested address and in response to the requested address lying outside the upper and lower limit address values for denying memory access;
(iii) in response to a command to run a designated application program, a priority authorization channel for temporarily unlocking said lockable means and for storing therein the upper and lower limit address values of the designated application program when the second routine is executed and for restoring a locked condition to the lockable means while the designated application program is running;
(g) means in response to the instruction counter containing an address inside the memory address space of the programmable memory or the repertory region for unlocking the lockable means and unblocking the priority authorization channel if blocked, but only before a running application program has attempted to address the application region.

* * * * *